Oct. 3, 1939.  C. A. DE GIERS  2,174,872
HYDROSTATIC LIQUID-CONTENTS GAUGE FOR TANKS UNDER AIR PRESSURE
Filed June 18, 1937

Clarence A. de Giers
INVENTOR

BY
Cooper, Kerr & Dunham
ATTORNEYS

Patented Oct. 3, 1939

2,174,872

UNITED STATES PATENT OFFICE 2,174,872

HYDROSTATIC LIQUID-CONTENTS, GAUGE FOR TANKS UNDER AIR PRESSURE

Clarence A. de Giers, Long Island City, N. Y., assignor to The Lequidometer Corporation, Long Island City, N. Y., a corporation of Delaware Application June 18, 1937, Serial No. 148,847

1 Claim. (Cl. 73—299)

This invention covers a hydrostatic gauge for indicating the liquid contents of tanks under air pressure.

When liquid is stored in a completely closed tank, air pressure is often generated above the liquid in the tank by increase of temperature. In some cases air is forced into the tank in order that liquid may be raised above tank level without pumping. Under such conditions the ordinary hydrostatic gauge is useless for indicating the liquid contents because the gauge would respond to the hydrostatic head of the liquid plus the air pressure.

An object of the present invention is to overcome that difficulty by using two Sylphons, one affected by the air pressure alone, and the other affected by the hydraulic head of the liquid plus the air pressure in the tank above the liquid. The two Sylphons are so interconnected with the indicator that it is affected only by the difference in pressure between the two Sylphons, which is the effect desired in order to indicate the hydraulic head of the liquid.

Further and other objects and advantages will be apparent from the specification and claim, and from the accompanying drawing which illustrates what is now considered the preferred embodiment of the invention.

Figure 1:
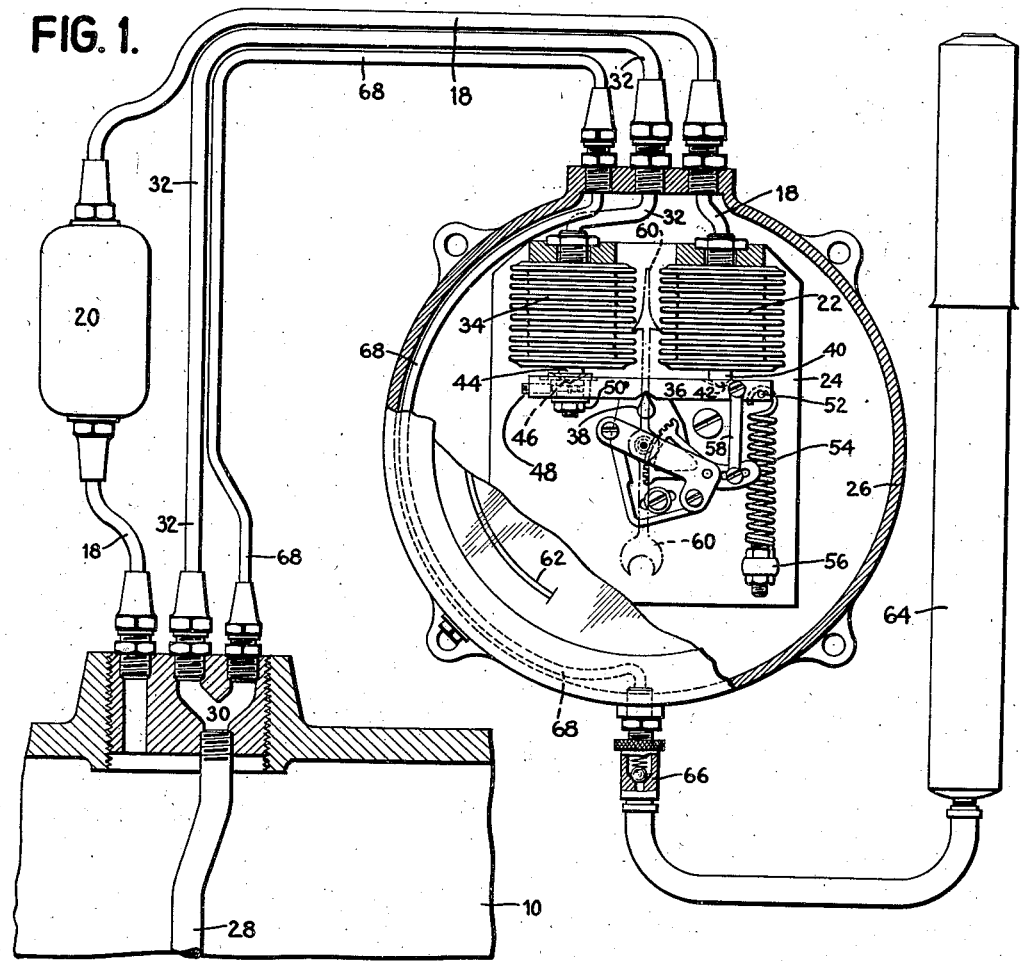
Fig. 1 shows the invention complete.
Figure 1:
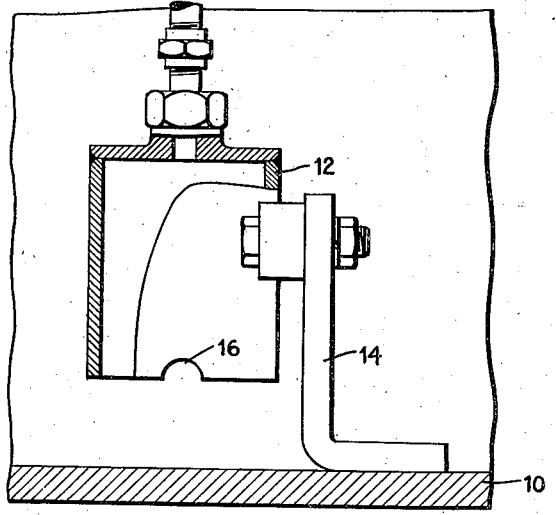

In the drawing 10 represents a storage tank in which is a bell 12 supported by a bracket 14. Liquid enters the bell only from the bottom and when the liquid level rises above the top of notch 16 the air entrapped in the bell is subjected to the hydraulic head of the liquid above the notch plus any air pressure in the tank above the liquid.

The top of the tank is connected by a pipe 18, through an expansion chamber 20, into the fixed upper end of Sylphon 22 supported on frame 24 in housing 26. Sylphon 22 is subjected only to the air pressure above the liquid in the tank.

Bell 12 is connected by pipe 28 through Y 30 and pipe 32 to the upper fixed end of Sylphon 34. This Sylphon is similar to Sylphon 22 and two Sylphons are are placed side by side on frame 24 as indicated in Fig. 1. It is plain that Sylphon 34 is subjected to the air pressure in the top of the tank, plus the static head of liquid above notch 16.

Figure 2:
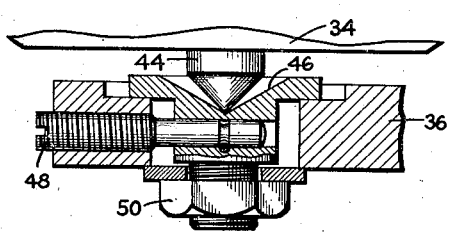
Fig. 2 is an enlarged detail showing an adjustment feature.

Below Sylphons 22 and 34 is a horizontal lever 36 fulcrumed on pivot 38. Projecting downwardly from the lower free end of Sylphon 22 is a point 40 engaging a cup bearing 42 in the lever. In like manner Sylphon 34 has a point 44 engaging a cup bearing 46 which is adjustable in lever 36 (Fig. 2) by a screw 48. Nut 50 serves to hold the bearing in adjustable position. This adjustment is provided because the Sylphons may not be exactly alike and it may be necessary to adjust their relative lever arms in order that their effects on the beam will be exactly alike when they are subjected internally to similar unit pressures.

Connected by pin 52 to an end of lever 36 is a tension spring 54 anchored to frame 24 at 56.

Rocking movement of lever 36 about pivot 38 is transmitted by link 58 to a well-known type of rack and pinion device for rotating pointer 60 to give indications on a dial or chart 62.

In operation, air is first forced by hand pump 64 or other source of supply through check valve 66, pipe 68, Y 30 and pipe 28 until air is forced out of notch 16 into the tank, thus forcing the liquid level in bell 12 to a predetermined point.

After that predetermined level is established and valve 66 is closed by its spring, then the liquid will rise in bell 12 to compress the air in pipes 28, 32 and in Sylphon 34 to a degree dependent on the hydraulic head of liquid in the tank, plus the air pressure in the top of the tank. The air pressure alone at the same time is effective in pipe 18 and Sylphon 22. Thus, the left end of lever 36 is subjected to the air pressure plus the hydraulic head while the right end of the lever is subjected to the air pressure alone, whereby all effect of air pressure on lever 36 is neutralized or balanced out and the spring 54 is called upon to resist only the liquid hydrostatic pressure effective through Sylphon 34 to rock lever 36 against the resistance of spring 54 thus causing pointer 60 to give an indication of that pressure.

It is to be understood that the invention is not limited to the specific embodiment herein illustrated and described, but may be used in other ways without departure from its spirit as defined by the following claim.

I claim:

In a gauge for indicating the hydraulic head of liquid in a tank containing air pressure, a Sylphon connected to the top of the tank and responsive only to the air pressure in the tank above the liquid, a second Sylphon substantially similar to said first Sylphon and connected below the liquid in the tank and responsive not only to the air pressure in the tank above the liquid but also to the liquid head, a fulcrumed lever mounted below the two Sylphons, means operatively connecting said Sylphons to said lever on opposite sides of the lever fulcrum whereby the effect of the air pressure is eliminated, adjustable means in the connection between one of said Sylphons and said lever for providing a definite relation between both Sylphons and the fulcrumed lever so that the effects of said Sylphons upon said lever will be alike when the Sylphons are subjected to similar unit pressures, a pointer, means interconnecting said lever to the pointer, and a spring connected to one arm of said fulcrumed lever and adapted to apply force to said arm to resist only the liquid hydrostatic pressure effective through one of the Sylphons to rock said lever upon its fulcrum to move said pointer to a position indicating the hydraulic head in the tank.

CLARENCE A. DE GIERS.